(12) United States Patent  
Wang et al.

(10) Patent No.: US 8,305,947 B2
(45) Date of Patent: Nov. 6, 2012

(54) MINIMIZING POWER CONSUMPTION IN A NETWORK DEVICE

(75) Inventors: Ren Wang, Portland, OR (US); Sanjay Rungta, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 275 days.

(21) Appl. No.: 12/704,773

(22) Filed: Feb. 12, 2010

(65) Prior Publication Data

US 2011/0199948 A1 Aug. 18, 2011

(51) Int. Cl.
  G08C 17/00 (2006.01)
  H04B 7/185 (2006.01)
  H04B 7/00 (2006.01)
(52) U.S. Cl. .................. 370/311; 455/13.4; 455/522
(58) Field of Classification Search .................. 370/311; 455/13.4, 522
  See application file for complete search history.

(56) References Cited

U.S. PATENT DOCUMENTS 5,982,937 A * 11/1999 Accad ........................... 382/239
7,564,861 B1 * 7/2009 Subbiah ........................ 370/428
2001/0011011 A1 * 8/2001 Kosugi ........................... 455/69
2002/0085631 A1 * 7/2002 Engwer ......................... 375/240
2003/0224734 A1 * 12/2003 Takekawa et al. ............. 455/72
2004/0246152 A1 * 12/2004 Castelli et al. ................. 341/87
2005/0176457 A1 * 8/2005 Shinozaki ...................... 455/522
2006/0265511 A1 * 11/2006 Riggs et al. ................... 709/231
2008/0062903 A1 * 3/2008 Yano et al. .................... 370/311
2010/0250982 A1 * 9/2010 Wang et al. ................... 713/320
2010/0278230 A1 * 11/2010 MacInnis et al. ........ 375/240.02
2010/0290522 A1 * 11/2010 Otani ...................... 375/240.02
2011/0040496 A1 * 2/2011 Banerjee et al. ............... 702/34
2011/0148883 A1 * 6/2011 Colby ........................ 345/440.2

* cited by examiner

Primary Examiner — Chi Pham
Assistant Examiner — Farah Faroul
(74) Attorney, Agent, or Firm — Grossman, Tucker, Perreault & Pfleger, PLLC

(57) ABSTRACT

A network interface device (NID) may determine whether the received data units of a computer system are to be compressed before transmitting the data units. The NID may determine the compression energy value consumed to compress the first K1 data units and a second transmission energy value to transmit the compressed first K1 data units. The NID may then estimate a first transmission energy value that may be consumed by the NID to transmit uncompressed first K1 data units using the second transmission energy value. The NID may then use the first and second transmission energy value and the compression energy value to determine if the remaining (N-K1) data units of the first data stream should be compressed.

20 Claims, 4 Drawing Sheets

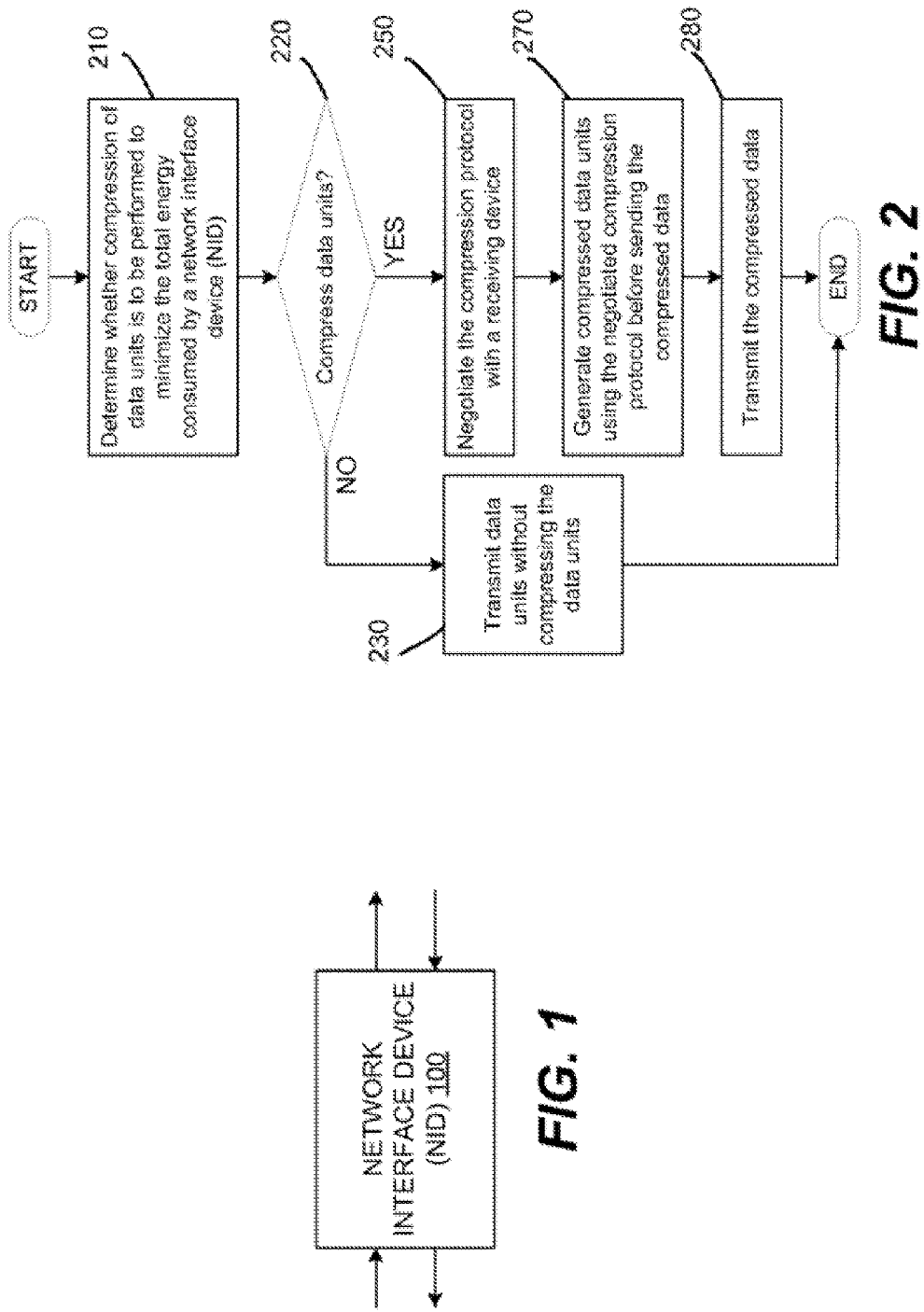

MINIMIZING POWER CONSUMPTION IN A NETWORK DEVICE

BACKGROUND

A computer platform may be equipped with network interface devices (NID), which may couple the computer platform to a network such as internet. A network interface device may support wired standards such as Ethernet and wireless standards such as WiFi, WiMAX, and 60 GHz. The energy consumed by the network interface device, especially while transmitting and receiving data units, is a significant portion (15-20% or higher for a laptop equipped with WiFi NIC) of the total energy of the computer platform. The energy consumed by the network interface device while actively transmitting and receiving data units is to be minimized to reduce the total energy consumed by the computer platform. Minimizing the energy consumption in a mobile computer platform is even more desirable, for example to extend the battery life.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

FIG. 1 illustrates a network interface device NID 100, which may support techniques to minimize the energy consumed by the NID 100 while NID 100 is actively transmitting and receiving data units according to one embodiment.

FIG. 2 is a flow-chart, which may support techniques to minimize the energy consumed by the NID 100 while NID 100 is actively transmitting and receiving data units according to one embodiment.

DETAILED DESCRIPTION

Figure 3:
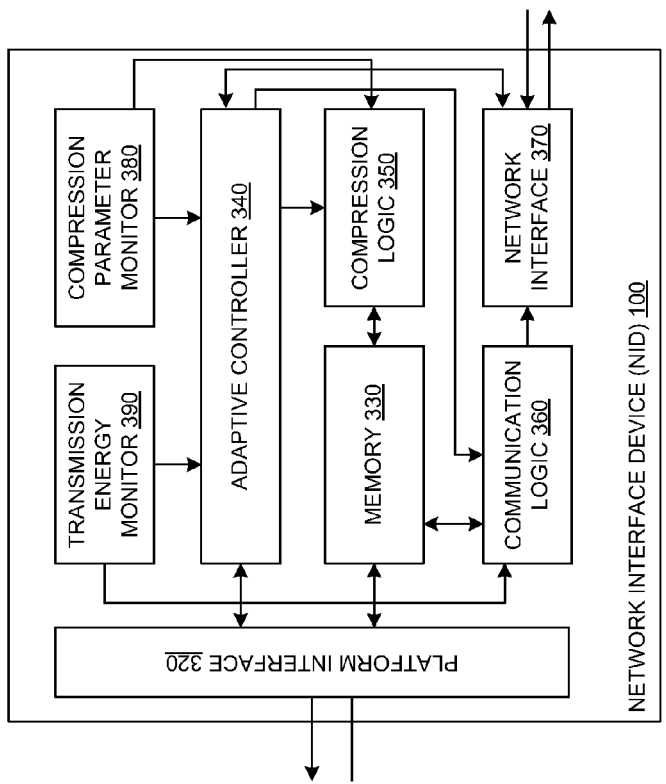
FIG. 3 illustrates a detailed block diagram of the network interface device 100, which may support techniques to minimize the energy consumed by the NID 100 while NID 100 is actively transmitting and receiving data units according to one embodiment.

The following description describes embodiments of a platform based verification of the contents of the I/O devices. In the following description, numerous specific details such as logic implementations, resource partitioning, or sharing, or duplication implementations, types and interrelationships of system components, and logic partitioning or integration choices are set forth in order to provide a more thorough understanding of the present invention. It will be appreciated, however, by one skilled in the art that the invention may be practiced without such specific details. In other instances, control structures, gate level circuits, and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device).

For example, a machine-readable medium may include read only memory (ROM); random access memory (RAM); magnetic disk storage media; optical storage media; flash memory devices; electrical, optical, acoustical or other similar signals. Further, firmware, software, routines, and instructions may be described herein as performing certain actions. However, it should be appreciated that such descriptions are merely for convenience and that such actions in fact result from computing devices, processors, controllers, and other devices executing the firmware, software, routines, and instructions.

An embodiment of a network interface device NID 100 is illustrated in FIG. 1. The NID 100 may be included in a computer platform to enable the computer platform to be coupled to a network such as internet. In one embodiment, the NID 100 may determine whether the data units received from a host processor of the computer platform are to be compressed. In one embodiment, the NID 100 may compress the data units if the energy consumed in compressing the data units and transmitting such compressed data units is lower than the energy consumed to transmit the uncompressed data units. In other embodiment, the NID 100 may transmit the data units without compressing the data units if the total energy consumed to compress the data units and then transmit is higher than the energy consumed to transmit the uncompressed data units. In one embodiment, if the total energy consumed in transmitting certain amount of data units on a channel is minimized then the overall average power consumed by the NID 100 may also be minimized.

An embodiment of technique used by the NID 100 to minimize the energy consumed by the NID 100 is illustrated in FIG. 2. In block 210, the NID 100 may determine whether compression of data units is to be performed to minimize the total energy consumed by the NID 100. In one embodiment, the NID 100 may compress the first data units (K1) and determine the compression energy value (Y) required to compress the first data units. In one embodiment, the NID 100 may then estimate a second transmission energy value (Z) consumed by the NID 100 to transmit the compressed data units. In one embodiment, the NID 100 may then estimate a first transmission energy value (X) that may be consumed by the NID 100 in transmitting uncompressed first data units (K1) of a first data segment. For example, the size of K1 may equal 10 kilobytes and after compression the size of the compressed data generated after compression first data units (K1) may equal 5 kilobytes (kb). The second transmission energy value consumed by the NID 100 in transmitting 5 Kb of compressed data may equal 0.5 joules (=Z) and it may be estimated that the first transmission energy value (X) to transmit K1 data units (=10 kb) may be equal to twice (X=2Z) that of the second transmission energy value (Z).

In block 220, the NID 100 may determine whether the remaining data units (other than the first data units) of the data segment is to be compressed and control passes to block 250 if the remaining data units are to be compressed and to block 230 otherwise. In one embodiment, the NID 100 may compare the first transmission energy value (X) consumed to transmit the data units K1 and a combined energy consumption value (Y+Z) to compress and then transmit the compressed data generated by compressing the first data units K1. In one embodiment, the NID 100 may determine to compress the remaining data units of the first data segment before transmitting the remaining data units if the combined energy consumption value (X+Y) is less than the transmission energy value (X). In block 230, the NID 100 may transmit the remaining data units (N-K1 data units) of the first data segment without compressing the remaining data units.

In block 250, the NID 100 may negotiate with the receiving entity such as other network device coupled to the network. In one embodiment, the NID 100 may use a standard or a proprietary protocol for negotiation with the receiving network device.

In block 270, the NID 100 may compress the remaining data units of the data segment using the compression protocol. In one embodiment, NID 100 may use data compression techniques such as lossy or lossless compression techniques to compress the remaining data units. In block 280, the NID 100 may transmit the compressed data units over the network.

An embodiment of detailed block diagram of the NID 100 is illustrated in FIG. 3. In one embodiment, the NID 100 may comprise a platform interface 320, a memory 330, an adaptive controller 340, compression logic 350, communication logic 360, a network interface 370, a compression parameter monitor 380, and a transmission energy monitor 390.

In one embodiment, the platform interface 320 may receive data units, for example, from a host processor and store the data units in the memory 330. In one embodiment, the platform interface 320 may support physical, electrical, and protocol interfaces to couple the NID 100 to other blocks of a computer platform.

In one embodiment, the adaptive controller 340 may determine whether the data units stored in the memory 330 are to be compressed before transmission. In one embodiment, the adaptive controller 340 may cause the data units stored in the memory 330 to be compressed if compressing the data units result in minimizing the energy consumed by the NID 100. In one embodiment, the energy consumed by the NID 100 may be minimized by compressing the data units if the sum of the energy consumed to compress and then transmit the compressed data is less than the transmission energy estimated to transmit uncompressed data units.

Figure 4:
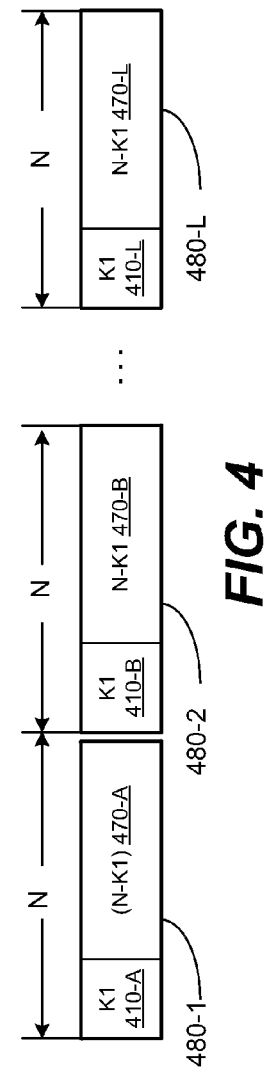
FIG. 4 is a flow-chart, a technique that selectively compresses data units before transmitting the data units to minimize the energy consumed by the NID 100 while NID 100 is actively transmitting and receiving data units according to one embodiment.

In one embodiment, the adaptive controller 340 may retrieve a first data segment 480-1 (of size N) of FIG. 4 from the memory 330 and send the first data units K1 410-A (of the N data units) to the compression logic 350. In one embodiment, the adaptive controller 340 may send a 'first start compression signal' to the compression logic 350. Also, the adaptive controller 340 may send a 'first estimate signal' to the compression parameter monitor 380 to determine the compression energy value (Y) consumed by the compression logic 350 to compress K1 410-A data units. In one embodiment, the adaptive controller 340 may receive compression energy value (Y) consumed by the compression logic 350 in response to the 'first estimate signal'.

In one embodiment, the adaptive controller 340 may send the compressed data to the communication logic 360 along with a 'first transmit signal' to the communication logic 360. In one embodiment, the 'first transmit signal' may include a start address from which compressed data generated by compressing K1 data units may be retrieved and transmitted. Also, the adaptive controller 340 may then send a 'second estimate signal' to the transmission energy monitor 390 to estimate a second transmission energy value (Z) consumed by the communication logic 360 in transmitting the compressed data. In one embodiment, the adaptive controller 340 may receive the 'second transmission energy value (Z)' in response to sending the second estimate signal.

In one embodiment, the adaptive controller 340 may use the 'second transmission energy value' (Z) to determine the 'first transmission energy value' (X). In one embodiment, if the compression gain achieved by the compression logic 350 is 50% (i.e., K1 data units of size 50 kilobytes may be compressed to 25 kilobytes) and the second transmission energy value (Z) consumed by the communication logic 360 to transmit the compressed data (of 25 kilobytes) is 300 milli-joules the first transmission energy value may be estimated as 600 milli-joules (i.e., X=2*Y). In one embodiment, the adaptive controller 340 may use the estimated first transmission energy value (X), the compressed energy value (Y), and the second transmission energy value (Z) to determine whether to compress the remaining data units (N-K1) 470-A of the first data stream 480-1.

In one embodiment, the adaptive controller 340 may compare the first transmission energy value (X) with the sum of the compress energy value (Y) and the second transmission energy value (Z) and if X is greater than (Y+Z), the adaptive controller 340 may determine to compress the remaining data units (N-K1) 470-A. In one embodiment, the adaptive controller 340 may send a second start compression signal to the compression logic 350 to initiate compression of the remaining data units (N-K1). In one embodiment, the adaptive controller 340 may cause the communication logic 360 to negotiate with the receiver to determine a compression protocol that may be used to generate compressed data.

In one embodiment, the adaptive controller 340 may cause the compressed data to be stored in a separate portion of the memory 330. In one embodiment, the adaptive controller 340 may send a 'second transmit signal' to the communication logic 360 to transmit the compressed data generated by compressing the remaining data units. In one embodiment, the second transmit signal may include a start address of the separate portion of the memory 330 from which the compressed data of the remaining data units may be retrieved and transmitted.

In one embodiment, if the adaptive controller 340 determines not to compress the remaining data units, the adaptive controller 340 may send a 'third transmit signal' to the communication logic 360 to transmit the remaining data units (uncompressed data). In one embodiment, the third transmit signal may include a start address in the memory 330 from which the remaining data units may be retrieved and transmitted.

In one embodiment, the communication logic 360 may perform various communication techniques or standards (e.g., TCP/IP or any other wired or wireless communication protocols) to transmit and receive the data units to and from the network interface 370. In one embodiment, the communication logic 360 may transmit data units of the data segments 480 over the channel coupled to the network interface 370.

In one embodiment, the communication logic 360 may retrieve the compressed data generated by compressing K1 data units from a start address included in the first transmit signal in response to receiving the first transmit signal. In one embodiment, the communication logic 360 may then modify the compressed data using a communication protocol format and may also include control values such as source and destination address. In one embodiment, the communication logic 360 may retrieve compressed data generated by compressing the remaining data units (N-K1) in response to receiving the second transmit signal. In one embodiment, the communication logic 360 may determine the start address from which the compressed data of (N-K1) remaining data units is to be retrieved from the memory 330 using the start address value included in the second transmit signal.

In one embodiment, the communication logic 360 may retrieve the remaining data units (N-K1), which are uncompressed in response to receiving the third transmit signal. In one embodiment, the communication logic 360 may determine the start address from which the uncompressed data of (N-K1) remaining data units is to be retrieved from the memory 330 using the start address value included in the third transmit signal. In one embodiment, the communication logic 360 may provide the data units to the network interface 370 that may be transmitted over a channel coupled to the network interface 370. In one embodiment, the communication logic 360 may allow the transmission energy monitor 390 to estimate or determine the second transmission energy value (Z) while the communication logic 360 transmits the compressed data generated by compressing K1 data units.

In one embodiment, the transmission energy monitor 390 may determine the energy consumed (i.e., second transmission energy value Z) by the communication logic 360 while transmitting compressed data generated by compressing K1 data units in response to receiving the second estimate signal. In one embodiment, the transmission energy monitor 390 may then send the second transmission energy value Z to the adaptive controller 340. In one embodiment, the transmission energy monitor 390 may determine the transmission energy based on the current and/or voltage consumed by the communication logic 360 and the network interface 370 in transmitting compressed data of K1 data units. In other embodiment, the transmission energy monitor 390 may determine an average transmission energy (Tavg) consumed by the communication logic 360 in transmitting the compressed data generated by compressing K1 data units. In one embodiment, the average transmission energy (Tavg) may be defined as the average of transmission energy consumed in transmitting each data unit.

In one embodiment, the compression logic 350 may compress the K1 410-A data units and may consume energy while performing compression in response to receiving the first start compression signal from the adaptive controller 340. In one embodiment, the compression logic 350 may allow the compression parameter monitor 380 to estimate the energy consumed by the compression logic 350 while compressing K1 data units. In one embodiment, the compression logic 350 may either receive K1 data units from the adaptive controller 340 or may retrieve the K1 data units from the memory 330 before performing compression of K1 data units. In one embodiment, the compression logic 350 may compress the remaining (N-K1) 470-A data units in response to receiving the second start compression signal from the adaptive controller 340. In one embodiment, the compression logic 350 may generate compressed data by compressing the remaining (N-K1) data units of the first data stream 480-1.

In one embodiment, the compression parameter monitor 380 may determine the energy consumed (i.e., compress energy value Y) by the compression logic 350 while compressing K1 data units in response to receiving the first estimate signal. In one embodiment, the compression energy monitor 380 may then send the compress energy value Y to the adaptive controller 340. In one embodiment, the compression parameter monitor 380 may determine an average compression energy consumed (Cavg), compression delay (D) and compression gain (Gcomp) while compressing K1 data units. In one embodiment, the average consumption energy consumed (Cavg) may be defined as an average of the compression energy consumed to compress each data unit. In one embodiment, the Gcomp may be defined as the compression gain for a unit of data may be equal '1/Gcomp' after compression. For example, while compressing a text file, the compression gain may equal 6 (i.e., a ratio of compressed data to uncompressed data may equal 6:1). In one embodiment, the compression delay (D) may be defined as a delay incurred in compressing a data unit.

Figure 5:
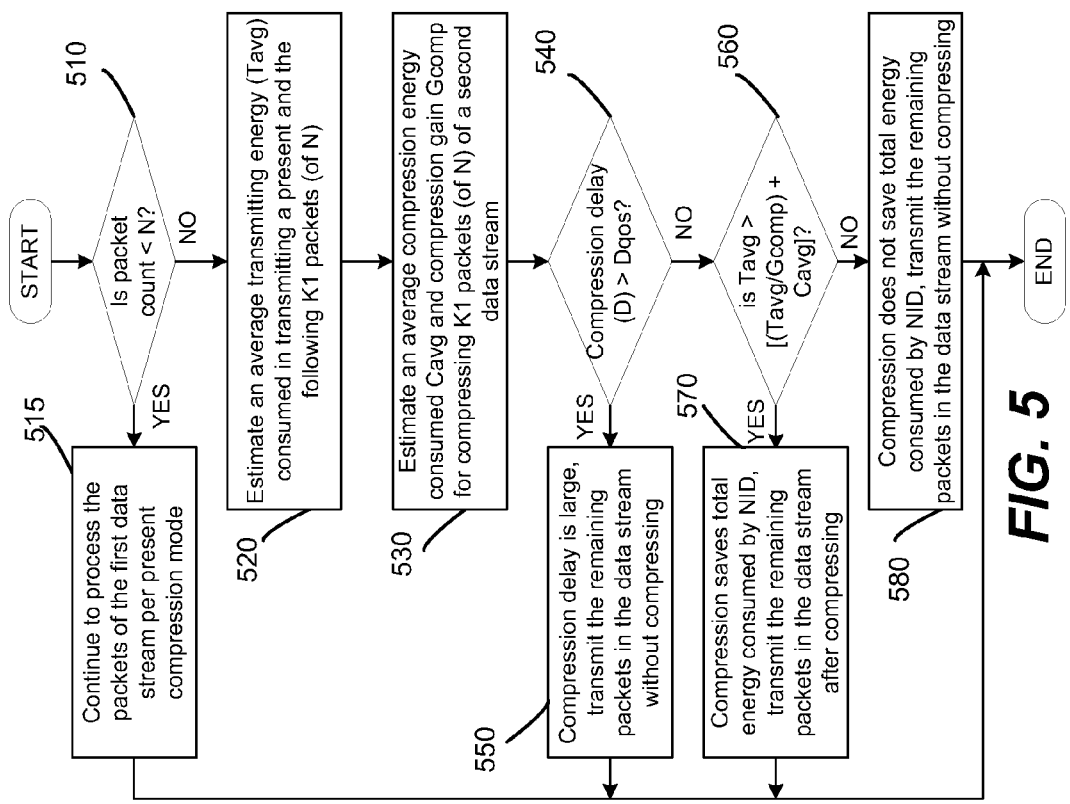
FIG. 5 illustrates a data block comprising one or more data segments, which may be used to determine whether compression technique is to be performed before transmitting data units according to one embodiment.

An embodiment of the NID 100 in which Tavg, Cavg, and Gcomp may be used to determine if compression of remaining data units is to be performed is illustrated in FIG. 5.

In block 510, the adaptive controller 340 may check if the packet count is less than N and control passes to block 515 if the packet count is less than N and to block 520 if the packet count is greater than N. In one embodiment, the adaptive controller 340 may check the packet count to determine if there are packets remaining in the first data segment (e.g., 480-1) that are to be transmitted over the channel. In one embodiment, if the packet count is less than N, there exists packets in the first data segment that are yet to be transmitted and the adaptive controller 340 may allow the remaining packets in the first data segment to be transmitted as per the compression mode determined for the first data segment.

In block 515, the communication logic 360 may continue to transmit the packets of the first data segment 480-A according to the determined compression mode (i.e., either with a specific type of compression or without compression) as determined by the adaptive controller 340 as described above.

Block 520 may be reached if all the packets of the first data segment 480-1 are transmitted over the channel and at a time point in which determination is to be made whether to compress the packets in a second data stream. In block 520, the adaptive controller 340 may estimate the average transmission energy (Tavg) consumed by the NID 100 in transmitting K1 410-B packets of the second data segment 480-B after receiving the second transmission energy value (Z) from the transmission energy monitor 390. In one embodiment, the Tavg may be estimated using the second transmission energy value. In one embodiment, the Tavg may be equal to Z/K1.

In block 530, the adaptive controller 340 may send a first estimate signal to the compression parameter monitor 380, which may determine an average compression energy (Cavg) consumed by the compression logic 350 in compressing K1 410-B packets of the second data segment 480-B and the compression gain (Gcomp).

In block 540, the adaptive controller 340 may check if the delay (D) incurred in compressing the K1 packets is greater than the delay (Dqos) allowed by the quality of service (QoS) value. Control passes to block 550 if the delay D is greater than the Dqos and to block 560 if the delay D is lesser than Dqos.

In block 550, the adaptive controller 340 may determine that the delay incurred in compressing the packets is larger than the allowable Dqos and the adaptive controller 340 may cause the remaining packets in the second data segment 480-B to be transmitted without compression using the communication logic 360.

In block 560, the adaptive controller 340 may check whether Tavg>[(Tavg/Gcomp)+Cavg] and control passes to block 570 if the Tavg is greater than [(Tavg/Gcomp)+Cavg] and to block 580 otherwise.

In block 570, the adaptive controller 340 may cause the remaining packets in the second data segment 480-B to be transmitted after compressing the packets using the compression logic 350. In one embodiment, the packets may be compressed using compression logic 350 and then the compressed data may be transmitted using the communication logic 360 as compression saves the total energy consumed by the NID 100.

In block 580, the adaptive controller 340 may cause the remaining packets in the second data segment 480-B to be transmitted without compressing the packets. In one embodiment, the uncompressed data may be transmitted using the communication logic 360 as compression does not save the total energy consumed by the NID 100.

Figure 6:
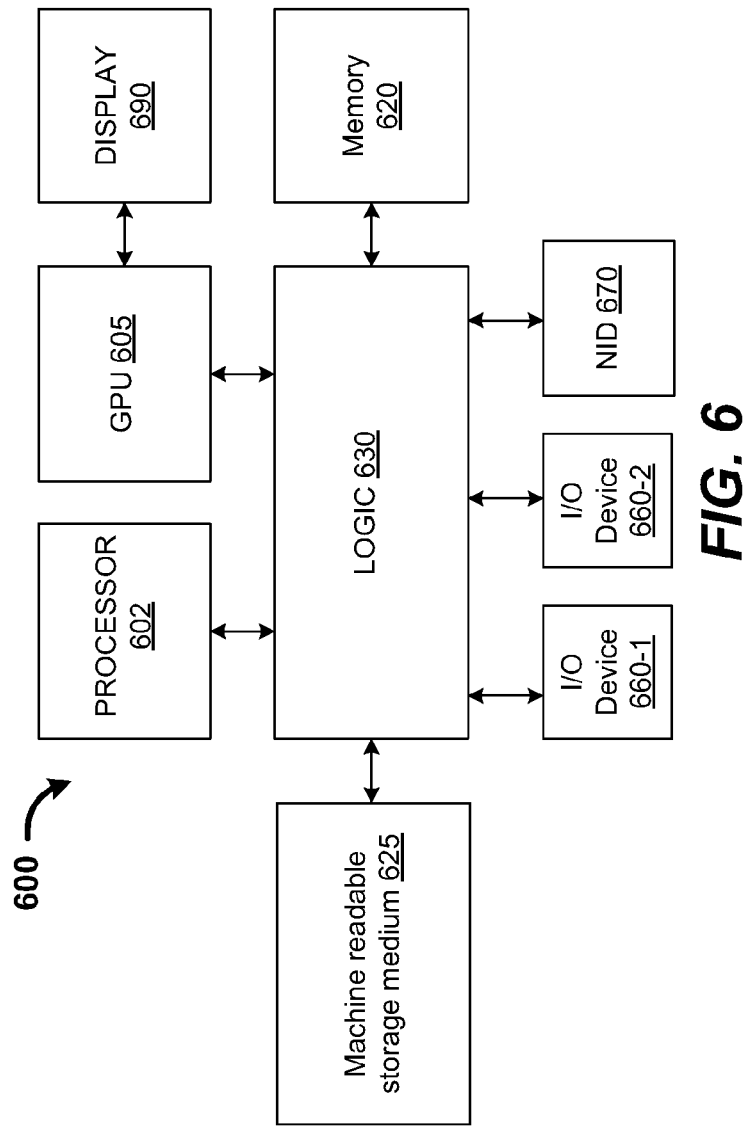
FIG. 6 illustrates a system 600, which includes a network interface device (NID) may support techniques to minimize the energy consumed by the NID while NID may be actively transmitting and receiving data units according to one embodiment.

An embodiment of a computer system 600 comprising a network interface device such as the NID 100 in which techniques to minimize energy consumed by the NID 100 may be used is illustrated in FIG. 6. The computer system 600 may include a general purpose processor 602 including a single instruction multiple data (SIMD) processor and a graphics processor unit (GPU) 605. The processor 602, in one embodiment, may process data and instructions stored in a machine readable storage medium 625 in addition to performing various other tasks or store a sequence of instructions, to provide enhancement operations in machine readable storage medium 625. However, the sequence of instructions may also be stored in the memory 620 or in any other suitable storage medium. In one embodiment, processing of instructions may be supported by the processor 602 or the GPU 605.

While a separate graphics processor unit GPU 605 is depicted in FIG. 6, in some embodiments, the processor 602 may be used to perform enhancement operations, as another example. The processor 602 that operates the computer system 600 may be one or more processor cores coupled to logic 630. The logic 630 may be coupled to one or more I/O devices 660 and 670, which may provide interface the computer system 600. The logic 630, for example, could be chipset logic in one embodiment. The logic 630 is coupled to the memory 620, which can be any kind of storage, including optical, magnetic, or semiconductor storage. The graphics processor unit 605 is coupled through a frame buffer to a display 640 that may store the contents of the buffers.

In one embodiment, the NID 670 may be included in a computer system 600 to enable the computer system 600 to be coupled to a network such as internet. In one embodiment, the NID 670 may determine whether the data units received from a host processor 602 or GPU 605 of the computer system are to be compressed. In one embodiment, the NID 670 may compress the data units if the energy consumed in compressing the data units and transmitting such compressed data units is lower than the energy consumed to transmit the uncompressed data units. In other embodiment, the NID 670 may transmit the data units without compressing the data units if the energy consumed to compress the data units then transmit is higher than the energy consumed to transmit the uncompressed data units. In other embodiment, the NID 670 may compress the data units if the compression delay (D) is greater than Dqos and if average transmission energy (Tavg) is greater [(Tavg/Gcomp)+Cavg], wherein Gcomp may represent the compression gain and Cavg may represent the average compression energy.

In one embodiment, the computer system 600 may represent a desktop computer system, a laptop computer system, a camera system, a cell phone, a mobile internet device (MID), a netbook, a personal digital assistant (PDA), or any other such similar system. In one embodiment, the computer system 600 may support network interface devices that support techniques to minimize the energy consumed by the network interface device 696 while actively transmitting and receiving data.

Certain features of the invention have been described with reference to example embodiments. However, the description is not intended to be construed in a limiting sense. Various modifications of the example embodiments, as well as other embodiments of the invention, which are apparent to persons skilled in the art to which the invention pertains are deemed to lie within the spirit and scope of the invention.

What is claimed is:

1. A network interface device, comprising: an adaptive controller, wherein the adaptive controller determines whether remaining data units of a data stream are to be compressed before transmitting the remaining data units based on a first transmission energy value, a second transmission energy value, and a compression energy value, a compression parameter monitor coupled to the adaptive controller, wherein the compression parameter monitor is to determine the compression energy value consumed to generate a first compressed data which is generated by compressing a first set of data units of the data stream, a transmission energy monitor coupled to the adaptive controller, wherein the transmission energy monitor is to determine the second transmission energy value consumed in transmitting the first compressed data.

2. The network interface device of claim 1, wherein the adaptive controller estimates the first transmission energy value using the second transmission energy value, wherein the first transmission energy value is the energy consumed by the network interface device to transmit the first data units in an uncompressed format.

3. The network interface device of claim 1 further comprises a compression logic coupled to the adaptive controller, wherein the compression logic consumes the compression energy value while generating the first compressed data.

4. The network interface device of claim 1 further comprises a communication logic coupled to the adaptive controller, wherein the second transmission energy value is the energy consumed by the communication logic to transmit the first compressed data over a channel coupled to the network interface device.

5. The network interface device of claim 1, wherein the adaptive controller determines that the first data units are to be compressed if the first transmission energy value is greater than a sum of the compression energy value and the second transmission energy value.

6. The network interface device of claim 5, wherein the size of the remaining data units is greater than the first data units.

7. The network interface device of claim 6, wherein the compression logic generates the first compressed data in response to receiving a first start compression signal from the adaptive controller, and store the first compressed data in a memory starting from a first start address.

8. The network interface device of claim 7, wherein the communication logic retrieves the first compressed data from the first start address in response to receiving a first signal from the adaptive controller before transmitting the first compressed data, wherein the first signal includes the first address.

9. The network interface device of claim 6, wherein the compression logic generates a second compressed data by compressing the remaining data units in response to receiving a start compression signal from the adaptive controller, and store the second compressed data in a memory starting from a second start address.

10. The network interface device of claim 9, wherein the communication logic retrieves the second compressed data from the second start address in response to receiving a second signal from the adaptive controller before transmitting the second compressed data, wherein the second signal includes the second address.

11. The method of claim 1, wherein a size of the first set of data units is less than the size of the remaining data units.

12. A method to minimize energy consumed in a network interface device, comprising: determining an average compression energy value (Cavg) consumed to generate a first compressed data of a data stream by compressing the first data units, determining a compression gain value (Gcomp) using the first compressed data and the first data units, estimating an average transmission energy value (Tavg) consumed to transmit the first data units using a transmission energy value consumed to transmit the first compressed data, determining whether remaining data units of the data stream are to be compressed based on the average compression energy value, the compression gain value, and the average transmission energy value, and transmitting a second compressed data that is generated by compressing the remaining data units if it is determined that the remaining data units are to be compressed.

13. The method of claim 12, wherein the average compression energy value is determined by measuring an average of compression energy consumed by the first data units.

14. The method of claim 12, wherein the compression gain value is determined by computing the ratio of the first data units to the first compressed data.

15. The method of claim 12 further comprises determining a compression delay, wherein the compression delay is a delay incurred in compressing the first data units.

16. The method of claim 15, wherein the second compressed data is generated if the compression delay is less than an allowable delay specified by the quality of service and if Tavg is less than [(Tavg/Gcomp)+Cavg].

17. The method of claim 16, wherein the first compressed data is stored in the memory starting from a first start address, the second compressed data is stored in a memory starting from a second start address.

18. The method of claim 17, wherein the second compressed data is transmitted after retrieving the second compressed data from the second start address.

19. The method of claim 18, wherein the Tavg is estimated based on an energy consumed in transmitting the first compressed data retrieved from the memory starting from the first start address.

20. The method of claim 19, wherein the Tavg is estimated using the energy consumed in transmitting the first compressed data and the compression gain value.

* * * * *

UNITED STATES PATENT AND TRADEMARK OFFICE
CERTIFICATE OF CORRECTION

PATENT NO. : 8,305,947 B2
APPLICATION NO. : 12/704773
DATED : November 6, 2012
INVENTOR(S) : Ren Wang et al.

Page 1 of 1

It is certified that error appears in the above-identified patent and that said Letters Patent is hereby corrected as shown below:

In column 9, line 23, in claim 11, delete "The method of claim" and insert -- The network interface device of claim --, therefor.

Signed and Sealed this
Fifth Day of February, 2013

Teresa Stanek Rea
*Acting Director of the United States Patent and Trademark Office*